United States Patent [19]

Takagi

[11] Patent Number: 4,655,348
[45] Date of Patent: Apr. 7, 1987

[54] MAGNETIC RECORDING DISC-JACKET ASSEMBLY

[75] Inventor: Kenji Takagi, Nagahama, Japan

[73] Assignee: Mitsubishi Plastics Industries Limited, Tokyo, Japan

[21] Appl. No.: 671,196

[22] Filed: Nov. 14, 1984

[30] Foreign Application Priority Data

Nov. 24, 1983 [JP] Japan .................................. 58-221079

[51] Int. Cl.⁴ ............................................. B65D 85/30
[52] U.S. Cl. .................................... 206/444; 206/313; 360/133; 156/583.1
[58] Field of Search ....................... 206/312, 313, 444; 156/290, 580.2, 582, 583.1, 583.4, 583.91, 539; 360/133, 99

[56] References Cited

U.S. PATENT DOCUMENTS

| | | | |
|---|---|---|---|
| 3,758,371 | 9/1973 | Lang et al. | 156/290 |
| 3,817,816 | 6/1974 | Watt | 156/583.4 |
| 4,217,386 | 8/1980 | Arons et al. | 156/290 |
| 4,294,640 | 10/1981 | Martinelli et al. | 206/444 |
| 4,304,621 | 12/1981 | Appoldt et al. | 206/444 |
| 4,391,669 | 7/1983 | Yamakawa et al. | 156/583.91 |
| 4,392,170 | 7/1983 | Okada | 360/133 |
| 4,400,227 | 8/1983 | Riemersma | 156/580.2 |
| 4,419,160 | 12/1983 | Wang et al. | 156/582 |
| 4,469,736 | 9/1984 | Machholz | 156/290 |
| 4,473,432 | 9/1984 | Leader et al. | 156/583.1 |
| 4,479,579 | 10/1984 | Milklos | 206/444 |
| 4,586,606 | 5/1986 | Howey | 206/444 |

Primary Examiner—Joseph Man-Fu Moy
Assistant Examiner—David T. Fidei
Attorney, Agent, or Firm—Oblon, Fisher, Spivak, McClelland & Maier

[57] ABSTRACT

A magnetic recording disc-jacket assembly within which a magnetic recording disc is positioned includes a jacket having a central window for receiving a drive shaft and an elongated head window for receiving a recording/reproducing head. A cleaning liner made of fibrous material is disposed at each side of the disc within said jacket and is bonded to the jacket at heat bonding portions. The fibrous material is heat pressed so as to have a reduced thickness adjacent the cut edges for the respective windows of the liner to prevent fraying of the fibrous material.

5 Claims, 4 Drawing Figures

MAGNETIC RECORDING DISC-JACKET ASSEMBLY

BACKGROUND OF THE INVENTION

1. Field of the Invention

The present invention relates to a magnetic recording disc-jacket assembly wherein a cleaning liner made of fibrous material such as a non-woven fabric is provided.

2. Related Art

In a magnetic recording disc-jacket assembly of this type, it is common to provide a cleaning liner made of soft and flexible fibrous material such as non-woven fabric for the protection and cleaning of a magnetic recording disc accommodated in the jacket. Such a cleaning liner is spot heat-bonded to the inner surface of the jacket at dotted or linear heat-bonding portions. The cleaning liner of this nature is likely to be frayed along cut edges formed by punching out apertures such as a central window and a head window. In order to prevent the fraying of the fibrous material along such cut edges, it has been proposed to form the above-mentioned heat-bonding portions more densely along the edge portions (see e.g. U.S. Pat. No. 4,392,170 or Japanese Unexamined Patent Publication No. 58510/1977). However, in such a proposal, when the liner is heat-bonded to the inner surface of the jacket sheet material, a greater quantity of heat is required to be applied to the high density heat-bonding portions, whereby there have been problems such as a deformation of the jacket sheet material or formation of sealing marks on the outersurface of the jacket, which impair the outer appearance.

SUMMARY OF THE INVENTION

Accordingly, it is an object of the present invention to overcome the above problems and to provide a magnetic recording disc-jacket assembly which is free from the fraying of the cleaning liner and which has a good outer appearance.

Namely, the present invention provides a magnetic recording disc-jacket assembly including:

(a) a magnetic recording disc;

(b) a jacket for rotatable accommodation of the disc, the jacket being provided with a central window for receiving a drive shaft of a recording/reproducing apparatus and an elongated head window for receiving a recording/reproducing head of said apparatus; and (c) a cleaning liner made of fibrous material disposed at each side of the disc and lined on the inner surface of the jacket with scattered heat-bonding portions, the liner being provided with a central window and a head window corresponding to the respective windows of the jacket; wherein the cleaning liner is heat-pressed along the entirety of cut edges for the respective windows of the liner to prevent fraying of the fibrous material.

BRIEF DESCRIPTION OF THE DRAWINGS

Now, the present invention will be described with reference to the preferred embodiment illustrated in the accompanying drawings.

DETAILED DESCRIPTION OF THE PREFERRED EMBODIMENTS

In the magnetic recording disc-jacket assembly of the present invention, the magnetic recording disc is of a conventional type. Namely, it is formed by a base film covered on one or both sides thereof with coated magnetic recording layers and has a central hole for engagement with a drive shaft of a recording/reproducing apparatus and an index hole formed in a predetermined position for detecting a tracking starting point.

The jacket is preferably made of a flexible sheet material so as to present a so-called floppy disc jacket. However, the jacket may be made of a pair of rigid plastic plate materials so as to present a so-called floppy disc cartridge.

Figure 2:
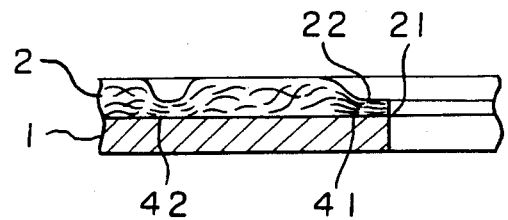
FIG. 2 is an enlarged cross-sectional view taken along line II—II of FIG. 1.

The magnetic recording disc-jacket assembly of the present invention is prepared by laminating a cleaning liner 2 of e.g. non-woven fabric on the inner surface of the jacket sheet material 1 of e.g. a hard polyvinyl chloride sheet, to form an opened blank 3, folding the blank 3 along the center 31, then folding side flaps 11 and 12 to form an envelope, inserting a flexible magnetic recording disc in the envelope, and folding and sealing a closure flap 13. Here, a cut edge 21 of the cleaning liner 2 is heat-pressed along the peripheral portion as shown in FIG. 2. Thus, fibers constituting the liner 2 are intertwined one another to have a higher density at such a portion than other portions, and the fibers are heat-bonded to one another at such a portion so that they are hardly frayed. Accordingly, when the heat-pressed portion 22 is spot melt-bonded to the jacket sheet material 1 at heat-bonding points 41 and 42, the heat-bonding may be made at a smaller number of points than the conventional method, whereby a less amount of heat is applied to the sheet material 1, thus minimizing the deformation of the sheet material 1 or the formation of sealing scars, and fraying of the fibers scarcely takes place, as mentioned above. This heat-pressed portion 22 is hard more or less. However, such a portion is recessed from the surface of the liner 2, as shown in FIG. 2, and therefore does not hinder the protective effect of the liner 2.

The heat-pressing is applied along the cut edges 21 corresponding to the peripheries of punched out apertures such as a central window 5 and a head window 51. Further, it is preferred that the cut edges along the periphery of the liner 2 is also subjected to heat-pressing treatment.

Now, there will be described an embodiment of the process for preparing a magnetic recording disc-jacket assembly of the present invention.

Figure 1:
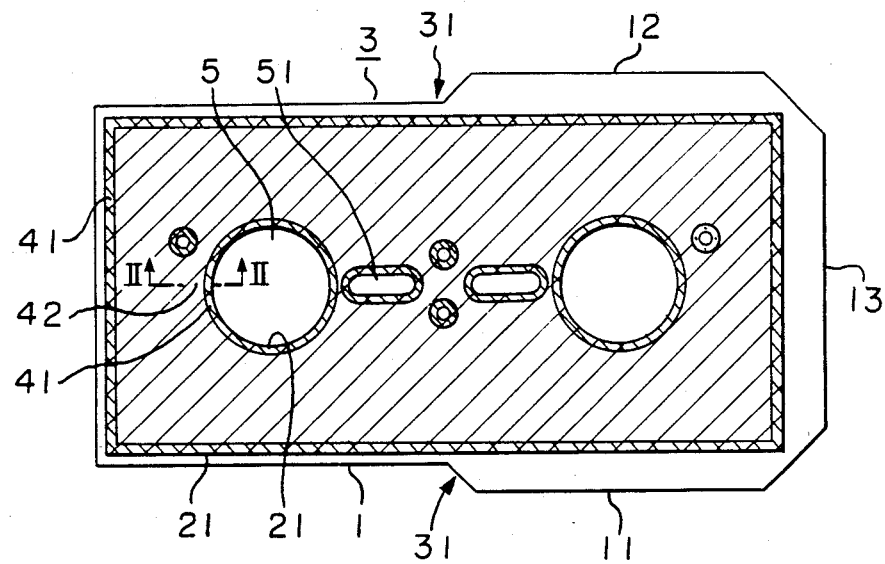
FIG. 1 is a plan view of the opened interior of a jacket for a magnetic recording disc, according to the present invention.
Figure 3:
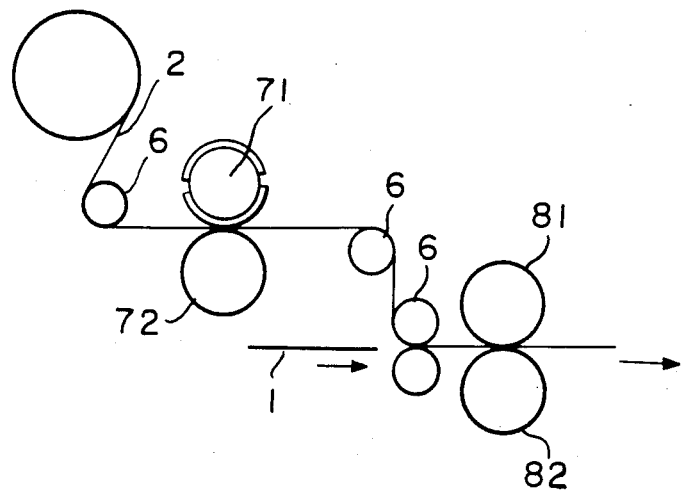
FIG. 3 is a schematic view illustrating a process for preparing a magnetic recording disc-jacket of the present invention.
Figure 4:
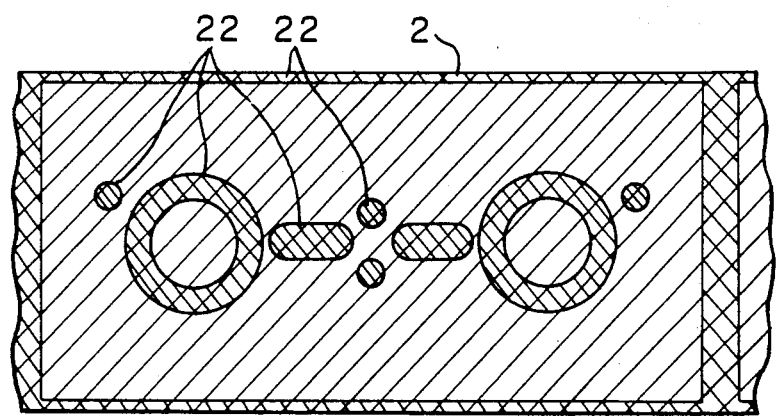
FIG. 4 is a plan view of a cleaning liner at a stage after the heat-pressing and prior to the lamination in the process illustrated in FIG. 3.

As shown in FIG. 3, when an elongate cleaning liner of non-woven fabric having a thickness of 0.2 mm and composed of e.g. 75% of rayon fibers and 25% of polypropylene fibers, is passed between a heat-pressing roll 71 and a bearing roll 72 via a guide roll 6, the liner is heat-pressed with patterns corresponding to the heat-pressed portions 22 indicated by hatching lines extending from the top left to the down right in FIG. 4. These patterns are designed to leave heat-pressed portions 22 having a width of about 2 mm after punching out apertures corresponding to a central window 5 and a head window 51 as shown in FIG. 1, following the lamination of the liner 2 on the jacket sheet material 1.

Further, in this embodiment, the heat-pressed portion 22 corresponding to the central window 5 is in the form of a ring. However, the heat-pressing may be applied to cover also the inside of the ring. In this embodiment, the temperature of the heat-pressing roll 71 is from 100° to 200° C. at its surface. The roll pressure may be adjusted depending upon the temperature or the surface area of the pattern. Further, in order to prevent the adhesion of the liner 2, a fluorine resin coating may be applied to its surface. Furthermore, a sheet such as a polyethylene terephthalate film may be wound on the bearing roll 72 to prevent the heat accumulation on the bearing roll 72 or to prevent the adhesion of the liner 2.

The heat-pressed cleaning liner 2 is then put on a jacket sheet material 1, and the resulting laminate is passed between a sealing roll 81 and a bearing roll 82, whereby the liner 2 is attached to the sheet material 1 at the heat-bonding points 41 along the heat-pressed portions 22 and at other heat-bonding points 42. Then, by means of a punch and a die (not illustrated), a blank 3 having a contour and punched apertures as shown in FIG. 1, is prepared. In the punching step, the portions to be punched are preliminarily heat-pressed as shown by heat-pressed portions 22, and are scarcely frayed even when a shearing force is exerted by the punching operation, whereby a clear cut edge 21 is obtainable.

In this embodiment, the liner 2 is laminated with the sheet material 1 in a continuous manner. However, the lamination can be conducted after the liner 2 is cut into a predetermined size.

The heat pressing of the liner 2 may be conducted after the liner 2 is put on the sheet material 1. In this case, the object of the present invention can be achieved without bringing about the thermal deformation of the sheet material 1 if the operation is conducted at a relatively low temperature so that the sheet material 1 and liner 2 do not melt-bond to one another and yet the fraying from the liner 2 can be prevented.

As described in the foregoing, in the magnetic recording disc-jacket assembly of the present invention, the peripheries along the cut edges of the cleaning liner are heat-pressed, and at the same time the cleaning liner is spottily melt-bonded to the jacket sheet material, whereby the fraying at the cut edges hardly takes place, and the outer appearance of the jacket is excellent without any deformation or formation of sealing scars due to the heating.

Obviously, numerous modifications and variations of the present invention are possible in light of the above teachings. It is therefore to be understood that within the scope of the appended claims, the invention may be practiced otherwise than as specifically described herein.

I claim:

1. A magnetic recording disc-jacket assembly comprising:
   (a) a magnetic recording disc;
   (b) a jacket for rotatable accommodation of the disc, the jacket being provided with a central window for receiving a drive shaft of a recording/reproducing apparatus and an elongated head window for receiving a recording/reproducing head of said apparatus; and
   (c) a cleaning liner made of fibrous material disposed at each side of the disc, said fibrous material being lined on the inner surface of the jacket and bonded thereto with scattered heat-bonding portions, said liner being provided with a central window and head window corresponding to the respective windows of the jacket, wherein the cleaning liner has heat-pressed portions along the entirety of cut edges for the respective windows of the liner to prevent fraying of the fibrous material, said heat pressed portions being bonded to said jacket only at said scattered heat bonding portions, whereby fraying of said liner is substantially prevented.

2. The magnetic recording disc-jacket assembly according to claim 1, wherein the fibrous material is a non-woven fabric.

3. The magnetic recording disc-jacket assembly according to claim 1, wherein the jacket is made of a flexible sheet material.

4. The magnetic recording disc-jacket assembly according to claim 1, wherein the jacket is made of a pair of rigid plastic plate materials.

5. The assembly of claim 1, wherein a thickness of said fibrous material at said heat pressed portions is less than a thickness of the remainder of said material.

* * * * *